United States Patent
Yu et al.

(10) Patent No.: US 9,907,999 B2
(45) Date of Patent: Mar. 6, 2018

(54) SYSTEMS AND METHODS FOR TRACKING, COLLECTING, AND ANALYZING USER DATA FOR GYMS

(71) Applicant: Tinoq Inc., Santa Clara, CA (US)

(72) Inventors: Daxiao Yu, Cupertino, CA (US); Yang Sun, San Jose, CA (US)

(73) Assignee: Tinoq Inc., Santa Clara, CA (US)

( * ) Notice: Subject to any disclaimer, the term of this patent is extended or adjusted under 35 U.S.C. 154(b) by 0 days.

(21) Appl. No.: 15/331,238

(22) Filed: Oct. 21, 2016

(65) Prior Publication Data

US 2017/0113096 A1    Apr. 27, 2017

Related U.S. Application Data

(60) Provisional application No. 62/244,661, filed on Oct. 21, 2015.

(51) Int. Cl.
*A63B 24/00* (2006.01)
*H04Q 9/00* (2006.01)
(Continued)

(52) U.S. Cl.
CPC .......... *A63B 24/0062* (2013.01); *G06F 3/067* (2013.01); *G06K 9/00342* (2013.01); *H04Q 9/00* (2013.01); *A63B 22/0048* (2013.01); *A63B 22/0076* (2013.01); *A63B 22/02* (2013.01); *A63B 22/0605* (2013.01); *A63B 22/0664* (2013.01); *A63B 71/0622* (2013.01); *A63B 2220/10* (2013.01); *A63B 2220/40* (2013.01); *A63B 2220/51* (2013.01); *A63B 2220/56* (2013.01); *A63B 2220/70* (2013.01); *A63B 2220/72* (2013.01); *A63B 2220/802* (2013.01); *A63B 2220/803* (2013.01);
(Continued)

(58) Field of Classification Search
None
See application file for complete search history.

(56) References Cited

U.S. PATENT DOCUMENTS

| | | | |
|---|---|---|---|
| 8,230,246 B1* | 7/2012 | Sharkey | G06F 1/1626 345/158 |
| 2008/0039136 A1* | 2/2008 | Byun | H04W 99/00 455/557 |

(Continued)

*Primary Examiner* — Leon-Viet Nguyen
(74) *Attorney, Agent, or Firm* — Wilmer Cutler Pickering Hale and Dorr LLP

(57) ABSTRACT

Systems and methods are provided for tracking, collecting, or analyzing user data for gyms. For example, the system can include a mobile device associated with a user and a tracking device attached to an exercise device. The tracking device can be configured to detect when the mobile device or the user enters within a proximity value of the tracking device and notify the mobile device with a notification signal and identification information of the exercise device. The mobile device can be configured to receive the notification signal from the tracking device, detect a received signal strength (RSS) of the notification signal, and determine whether the RSS is above or at a pre-determined threshold. When the RSS is above or at the pre-determined threshold, the mobile device records the identification information of the exercise device. When the RSS is below the pre-determined threshold, the mobile device ignores the notification signal.

21 Claims, 12 Drawing Sheets

(51) Int. Cl.
    *G06F 3/06*      (2006.01)
    *G06K 9/00*      (2006.01)
    *A63B 71/06*     (2006.01)
    *A63B 22/00*     (2006.01)
    *A63B 22/02*     (2006.01)
    *A63B 22/06*     (2006.01)

(52) U.S. Cl.
    CPC ..... *A63B 2220/805* (2013.01); *A63B 2225/15* (2013.01); *A63B 2225/50* (2013.01); *G08C 2201/93* (2013.01); *H04Q 2209/40* (2013.01); *H04Q 2209/43* (2013.01); *H04Q 2209/50* (2013.01)

(56) References Cited

U.S. PATENT DOCUMENTS

| | | | | |
|---|---|---|---|---|
| 2010/0203829 A1* | 8/2010 | Granqvist | ............ | A61B 5/0002 455/41.1 |
| 2011/0268024 A1* | 11/2011 | Jamp | ................... | H04W 16/14 370/328 |
| 2014/0274031 A1* | 9/2014 | Menendez | ........ | H04W 52/0209 455/426.1 |
| 2015/0293580 A1* | 10/2015 | Munoz | ................. | G06F 1/3206 713/323 |
| 2016/0358443 A1* | 12/2016 | True | ....................... | G08B 21/02 |

\* cited by examiner

SYSTEMS AND METHODS FOR TRACKING, COLLECTING, AND ANALYZING USER DATA FOR GYMS

RELATED APPLICATION

This application claims priority to U.S. Provisional Patent Application No. 62/244,661, titled "User Data Collection and Analysis System for Gyms," which was filed on Oct. 21, 2015 and is incorporated herein in its entirety. This application also relates to U.S. patent application Ser. No. 15/262,494, titled "Smart Fitness and Exercise Equipment," which was filed on Sep. 12, 2016 and is incorporated herein in its entirety.

BACKGROUND OF THE INVENTION

Technical Field

This invention relates generally to the field of tracking, collecting, and analyzing user data for gyms.

Description of the Related Art

There are tens of millions of paid members today who exercise regularly in gyms, including fitness centers, health clubs, and recreational centers. Many of them follow an exercise routine, either set by themselves or by their trainers, to achieve certain results in personal fitness and health. Therefore, it is important and valuable to track gym members' activities, which can then be used to compare against the pre-set routines and to help adjust or set new goals.

However, in most gyms, once a member checks into the gym, the member (and the member's trainer, if any) loses track of the exercise activities, unless the member or the member's trainer pulls out a pen and paper to manually write down the activities. The "pen and paper" approach is used by some people, but often works poorly because of its inconvenience. In recent years, a number of mobile applications (apps) have emerged to help members log exercise activities electronically, but these apps still require manual inputs and hence are not easy to be used by most members.

There are also solutions that combine wearable devices and mobile apps to record exercise activities, such as counting the number of steps that a user has walked. The types of activities which can be recognized, as well as the recognition accuracy, are limited, thus preventing wearable devices from serving as general exercise tracking systems in gyms where many different types of activities can be conducted.

Other existing solutions extend certain fitness equipment with electronic devices for a trainer to manually set a personalized exercise routine on each of the exercise devices, and for each member who is willing to use this service. But this type of solution is known to be inconvenient—the routine setting is manual and time consuming, and every time a member needs to change a routine on any equipment, a trainer or other person must be present to help. In addition, this approach can be costly because the installation procedure for each individual exercise device is complicated, requiring drilling holes on the equipment stands for power-line wiring, communication cable wiring, and/or electronic display mounting. The inconvenience and high cost of this type of solution prohibit it from massive adoption in gyms, and are therefore not available for most gym members.

There are also existing solutions that focus on monitoring the usage of exercise devices or equipment, and reporting how much time the equipment is occupied and/or operated by users. A gym can use this information to decide whether to add or reduce the number of a specific type of equipment. One of the missing elements in this type of solution is associating the usage time of equipment to the user who uses that equipment. Therefore, it does not solve the fundamental problem of tracking each user's activities in the gym.

There are many reasons for the lack of a powerful, convenient, low-cost, and universal gym user data collection system. First, there are millions of expensive exercise equipment that have already been deployed in gyms. Replacement of the existing equipment with intelligent ones is costly and slow. Second, there are many equipment manufacturers and vendors, but there is no widely accepted standard to unify the communications protocols. Third, although there are various mobile apps to help members log exercise activities electronically, these apps, as mentioned above, still require manual inputs, and therefore, create another level of inconvenience for the users.

Therefore, it is desirable to provide methods and systems that overcome these and other deficiencies of the related art.

SUMMARY

In accordance with the disclosed subject matter, systems and methods are provided for tracking, collecting, and analyzing user data for gyms.

Disclosed subject matter includes, in one aspect, a tracking device attached to an exercise device. The tracking device includes a proximity sensor system, a wireless transceiver, a memory, and a processor. The proximity sensor is configured to detect when a mobile device or a user associated with the mobile device enters within a proximity value of the proximity sensor system. The wireless transceiver is configured to transmit at least one signal to the mobile device. The memory stores a module. The processor is configured to run the module stored in the memory that is configured to cause the processor to: receive an onboard signal from the proximity sensor system indicating when the mobile device or the user enters within the proximity value of the proximity sensor system, and in response to receiving the onboard signal, generate a command signal that causes the wireless transceiver to send a notification signal to the mobile device, where the notification signal (1) notifies the mobile device when the mobile device or the user enters within the proximity value of the proximity sensor system and (2) includes identification information of the exercise device.

Disclosed subject matter includes, in another aspect, a mobile device. The mobile device includes a wireless transceiver, a memory, and a processor. The wireless transceiver configured to receive at least one signal from a tracking device attached to an exercise device. The memory stores a module. The processor is configured to run the module stored in the memory that is configured to cause the processor to: receive the notification signal from the tracking device via the wireless transceiver, where the notification signal (1) indicates when the mobile device or a user associated with the mobile device enters within a proximity value of the tracking device and (2) includes identification information of the exercise device. The processor is configured to detect a received signal strength (RSS) of the notification signal and determine whether the RSS is above or at a pre-determined threshold. When the RSS is above or at the pre-determined threshold, the processor is configured to record the identification information of the exercise device. When the RSS is below the pre-determined threshold, the processor is configured to ignore the notification signal.

Disclosed subject matter includes, in yet another aspect, a system. The system includes a mobile device associated with a user and a tracking device attached to an exercise device. The tracking device is configured to detect when the mobile device or the user enters within a proximity value of the tracking device and send a notification signal to the mobile device with identification information of the exercise device. The mobile device is configured to receive the notification signal from the tracking device, detect a received signal strength (RSS) of the notification signal, and determine whether the RSS is above or at a pre-determined threshold. When the RSS is above or at the pre-determined threshold, the mobile device is configured to record the identification information of the exercise device. When the RSS is below the pre-determined threshold, the mobile device is configured to ignore the notification signal.

The present disclosure also discloses methods that perform the functions of the apparatuses described above.

The present disclosure also discloses computer readable media that include executable instructions (e.g., computer program of instructions) operable to cause a device to perform the functions of the apparatuses described above.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be made to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Figure 1:
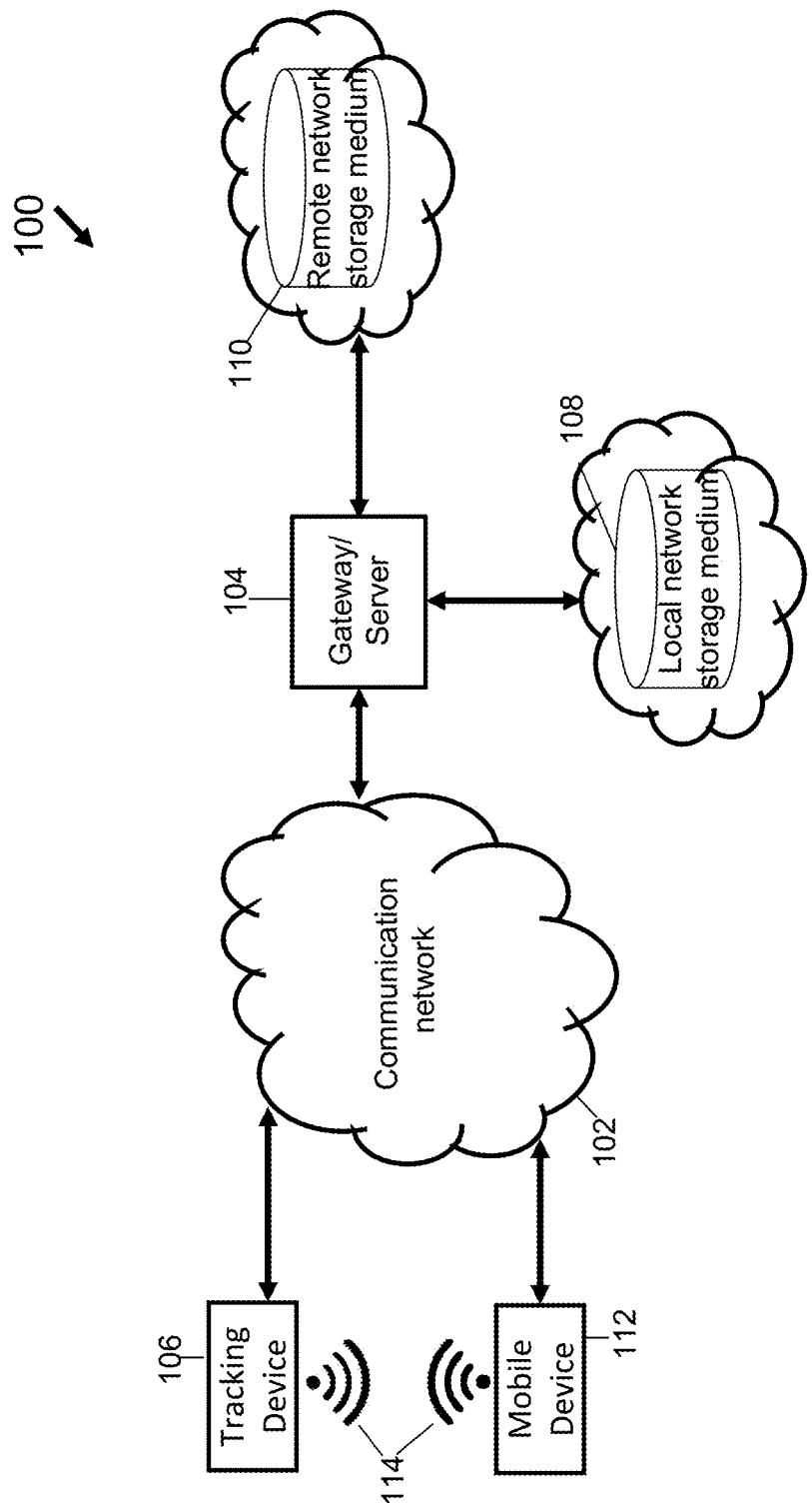
FIG. 1 illustrates an environment for tracking, collecting, and/or analyzing user data for gyms according to certain embodiments of the present disclosure.

FIG. 1 illustrates an environment 100 for tracking, collecting and/or analyzing user data in gyms according to certain embodiments of the disclosed subject matter. The environment 100 can include a communication network 102, a server 104, a tracking device 106, a local network storage medium 108, a remote network storage medium 110, a mobile device 112, and a wireless network 114. Some or all components of the environment 100 can be coupled directly or indirectly to the communication network 102. The components included in the environment 100 can be further broken down into more than one component and/or combined together in any suitable arrangement. Further, one or more components can be rearranged, changed, added, and/or removed. For example, the environment 100 can include more than one tracking device 106 and/or more than one mobile device 112.

The tracking device 106 can be attached to an exercise device. Non-limiting examples of exercise devices include treadmills, ellipticals, exercise bikes, rowing machines, stair climbers, weightlifting benches, weight machines, etc. In some embodiments, the tracking device 106 can be attached to an exercise device non-intrusively. In some embodiments, the tracking device 106 can be taken off from one exercise device and attached to another exercise device. The tracking device 106 can be configured to communicate wirelessly with at least one mobile device 112, the server 104, and/or other suitable components of the environment 100. The tracking device 106 can detect when a user or his or her mobile device 112 approaches to the tracking device 106 and notify the mobile device 112 via the wireless network 114. The tracking device 106 can detect when the user or his or her mobile device 112 leaves the tracking device 106 and notify the mobile device 112 via the wireless network 114. In some embodiments, the tracking device 106 can sense or detect movements of an exercise device and/or the user using the exercise device, such as linear motion, rotation, or any suitable combination thereof. The structure and function of the tracking device 106 are explained in more detail below.

The mobile device 112 can be connected to the tracking device 106 via the wireless network 114. In some embodiments, the mobile device 112 can also be configured to communicate wirelessly with the server 104 and/or other suitable components of the environment 100. The mobile device can be a tablet computer, a personal digital assistant (PDA), a pager, a mobile or smart phone, a wireless sensor, a wearable device, or any other suitable device.

The communication network 102 can include a network or combination of networks that can accommodate private data communication. For example, the communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows the communication network 102 as a single network; however, the communication network 102 can include multiple interconnected networks listed above.

The server 104 can be a single server, a network of servers, or a farm of servers in a data center. The server 104 can be coupled to a network storage system. The network storage system can include two types of network storage devices: a local network storage medium 108 and a remote network storage medium 110. The local network storage medium 108 and the remote network storage medium 110 can each include at least one physical, non-transitory storage medium, flash memory, a magnetic disk drive, an optical drive, a programmable read-only memory (PROM), a read-only memory (ROM), or any other memory or combination of memories. The local network storage medium 108 and the remote network storage medium 110 can be part of the server 104 or can be separated from the server 104.

In some embodiments, the server 104 can be located within or near a gym or a fitness center. In some embodiments, the server 104 can be located at a remote location. In some embodiments, the server 104 can also include a gateway and/or an access point to direct any signals received from the tracking device 106, the mobile device 112, and/or other components of the environment 100.

In some embodiments, the tracking device 106 and the mobile device 112 can communicate with each other through the wireless connection 114. The wireless connection can be WiFi, ZigBee, IEEE802.15.4, Bluetooth, near field communication (NFC), or another connection using any other suitable wireless protocol standard or combination of standards. In some embodiments, the tracking device 106 and the mobile device can also communicate through the communication network 102.

Figure 6:
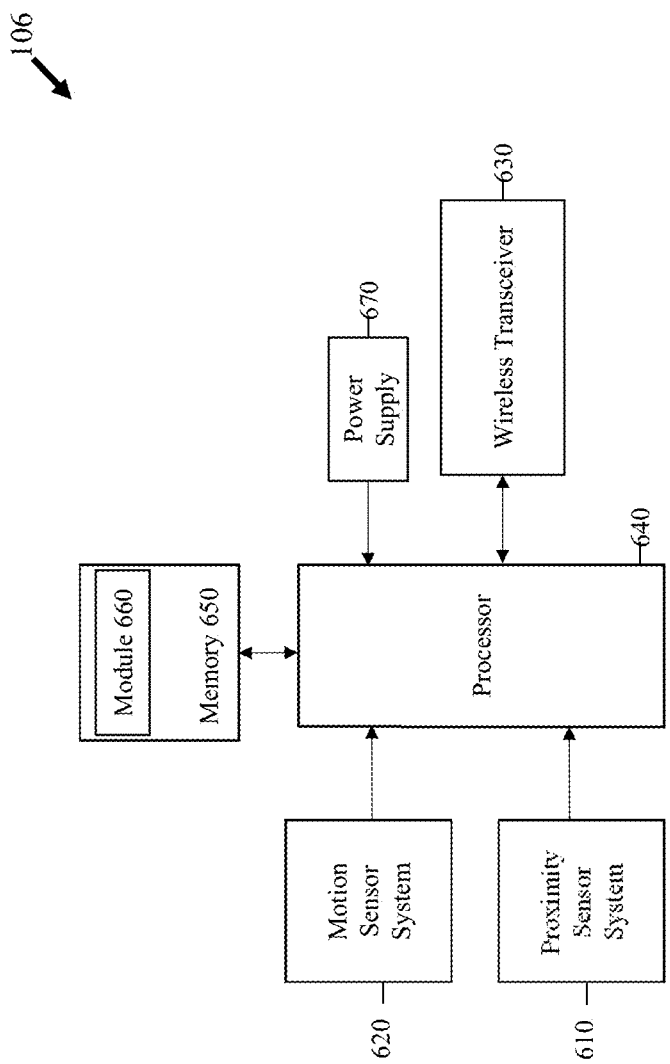
FIG. 6 illustrates a block diagram of a tracking device according to certain embodiments of the present disclosure.

FIG. 6 illustrates a block diagram of a tracking device 106 according to certain embodiments of the present disclosure. The tracking device 106 includes a proximity sensor system 610, a motion sensor system 620, a wireless transceiver 630, a processor 640, a memory 650, a module 660, and a power supply 670. The components included in the tracking device 106 can be further broken down into more than one component and/or combined together in any suitable arrangement. Further, one or more components can be rearranged, changed, added, and/or removed.

The proximity sensor system 610 can be configured to detect when a user with a mobile device 112 and/or the mobile device 112 enters within a first proximity value of the proximity sensor system 610. The proximity sensor system 610 can also be configured to detect when the user or the mobile device 112 becomes outside a second proximity value of the proximity sensor system 610. In some embodiments, the first proximity value is the same as the second proximity value. In some embodiments, the first proximity value is different from the second proximity value. For example, the proximity sensor system 610 may use a smaller proximity value to determine when the user is going to use the exercise device and a larger proximity value to determine when the user is going to leave the exercise device. In some embodiments, the proximity value can be based on distance, such as 1 cm, 5 cm, or any other suitable distance. In some embodiments, the proximity value can be based on area, such as $0.2 \text{ m}^2$, $0.5 \text{ m}^2$, or any other suitable area. When the proximity sensor system 610 detects the mobile device 112 and/or the user enters within the proximity value of the proximity sensor system 610, it can generate an onboard signal. In some embodiments, when the proximity sensor system 610 detects the mobile device 112 and/or the user becomes outside the second proximity value of the proximity sensor system 610, it can generate a departure signal.

The proximity sensor system 610 includes at least one proximity sensor, such as a passive infra-red (PIR) sensor, an ambient light sensor, a photoelectric sensor, an ultrasonic sensor, a time of flight distance sensor, a thermopile sensor, or any other suitable sensors or combination of sensors.

In typical occupancy sensor or motion sensor designs, it may be important to design a sensor function with a wide detection angle and a long detection range, so that the detection coverage area is large. In some embodiments of the present disclosure, however, to detect whether an exercise device is occupied, a large coverage area may trigger many false positive alarms. It is because even if a user is not using the equipment, as long as he or she is close enough to the equipment, the sensor will still be triggered. To solve this problem, in some embodiments the occupancy sensor can be designed so that it will be triggered only when a user is in close proximity of the equipment or on the equipment. It may be possible to limit a proximity sensor's coverage area or range, for example, by specific design of the sensor lens and sensor housing, as well as sensor placement during the installation stage.

Figure 5:
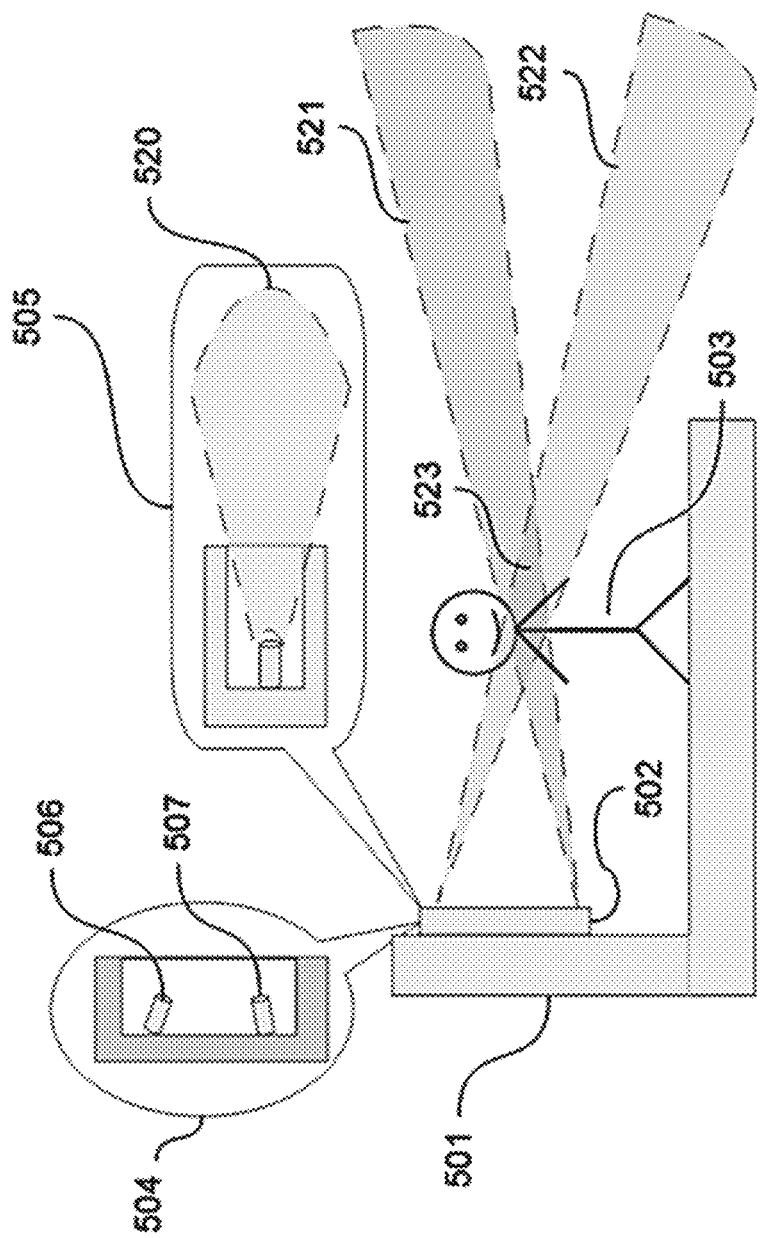
FIG. 5 shows an arrangement of two proximity sensors according to certain embodiments of the present disclosure.

In one embodiment, the proximity sensor system 610 includes one or more PIR sensors. Each of the one or more PIR sensors has its own coverage area, and they are placed in a way such that the intersection of the coverage areas is limited. When the user and/or the mobile device 112 are in the limited area, each of the one or more PIR sensors can be triggered. FIG. 5 illustrates an exemplary design of the proximity sensor including two PIR sensors according to one embodiment of the present disclosure.

FIG. 5 shows an arrangement of two proximity sensors according to certain embodiments of the present disclosure. As shown in FIG. 5, a proximity sensor system 502 includes two PIR sensors 506 and 507, which are installed on an exercise device 501. A user 503 is using the exercise device 501. The side view 504 of the proximity sensor 502 shows the placement of the two PIR sensors 506 and 507. The top view 505 shows the top view of the proximity sensor's coverage 520. A side view 521 of the sensing unit 507's coverage and a side view 522 of the sensing unit 506's coverage intersect at an area 523, which is currently occupied by the user 503. Whenever a user gets into the intersection area 523, the proximity sensor 502 detects that the user 503 is within a proximity value of the equipment 501.

In some embodiments, the proximity sensor system 610 may include more than one type of proximity sensor. For example, the proximity sensor system 610 can use an ambient light sensor to detect when the user and/or the mobile device 112 is approaching the exercise device and a PIR sensor to detect when the user and/or the mobile device 112 leaves the exercise device. In some embodiments, the detection threshold of the ambient light sensor can be smaller than the detection threshold of the PIR sensor.

The motion sensor system 620 can be configured to detect motions of a user associated with the mobile device 112. As non-limiting examples, the motion sensor system 620 can detect how many times a user exercises with a pin-loaded or plate-loaded device, a free weight device, or power racks. The motion sensor system 620 can include one or more motion detection sensors, such as accelerometers, gyroscopes, vibration sensors, pressure sensors, or any other suitable sensors or combination of sensors. The design and functionality of the motion detection sensors are described in more detail in U.S. patent application Ser. No. 15/262,494, titled "Smart Fitness and Exercise Equipment," which was filed on Sep. 12, 2016 and is incorporated herein in its entirety.

The wireless transceiver 630 can be configured to transmit signals to the mobile device 112 and/or any other components of the environment 100. In some embodiments, the wireless transceiver 630 can also be configured to receive signals from the mobile device 112 and/or any other components of the environment 100. The wireless transceiver 630 can enable the communication with the mobile device 112 via the wireless network 114. For example, the wireless transceiver 630 can send a notification signal that notifies the mobile device 112 when the mobile device 112 and/or the user enters within the proximity value of the proximity sensor system 610. The notification signal can also include identification information of the exercise device to which the tracking device 106 is attached. Non-limiting examples of the identification information include the unique low-power wireless interface ID, the type of the exercise device, and/or the identification number of the device. In some embodiments, the wireless transceiver 630 can send another notification signal to the mobile device 112 when the mobile device 112 or the user becomes outside the second proximity value of the proximity sensor system 630. In some embodiments, the wireless transceiver 630 can receive at least one reporting signal from the mobile device 112. As a non-limiting example, the report signal can be related to the motions of a user associated with the mobile device 112. In some embodiments, the report signal can also include items described in connection with FIGS. 2-4. In some embodiments, the wireless transceiver 630 can send one or more status signals to the server 104 and/or the gateway. As non-limiting examples, the status signals can include the payload of the notification signal sent by the wireless transceiver 630, the battery level of the tracking device 106, or run-time statistics of the tracking device 106 and/or the mobile device 112.

The processor 640 can include one or more cores and can accommodate one or more threads to run various applications and modules. The software can run on the processor 640 capable of executing computer instructions or computer code. The processor 640 might also be implemented in hardware using an application specific integrated circuit (ASIC), programmable logic array (PLA), field programmable gate array (FPGA), or any other integrated circuit.

The memory 650 can be a non-transitory computer readable medium, flash memory, a magnetic disk drive, an optical drive, a PROM, a ROM, or any other memory or combination of memories.

The processor 640 can be configured to run the module 660 stored in the memory 650 that is configured to cause the processor 640 to perform various steps that are discussed in the disclosed subject matter. For example, the module 660 can be configured to cause the processor 640 to receive an onboard signal from the proximity sensor system 610 indicating when the mobile device 112 and/or the user enters within the proximity value of the proximity sensor system 610. The module 660 can be configured to cause the processor 640 to, in response to receiving the onboard signal, generate a command signal that causes the wireless transceiver 630 to send a notification signal to the mobile device 112. The notification signal can notify the mobile device 112 when the mobile device 112 and/or the user enters within the proximity value of the proximity sensor system 610. The notification signal can also include identification information of the exercise device to which the tracking device 106 is attached. In some embodiments, the module 660 can be configured to cause the processor 640 to receive a departure signal from the proximity sensor system 610 indicating when the mobile device 112 and/or the user become outside the second proximity value of the proximity sensor system 610. And in response to receiving the departure signal, it can generate a second command signal that causes the wireless transceiver 630 to send a second notification signal to the mobile device 112, where the second notification signal notifies the mobile device 112 when the mobile device 112 and/or the user becomes outside the second proximity value of the proximity sensor system 610.

The power supply 670 provides power to one or more other components of the tracking device 106. In some embodiments, the power supply 670 can be a battery source. In some embodiments, the power supply 670 can provide alternating current (AC) and/or direct current (DC) power via an external power source.

Figure 7:
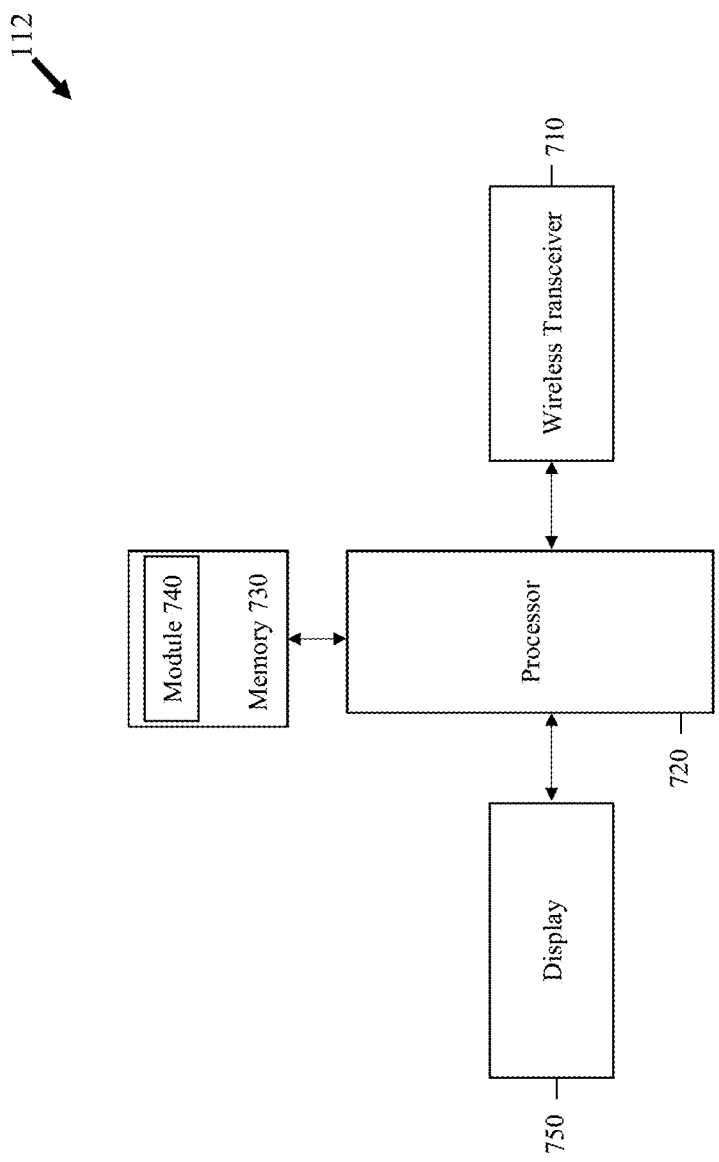
FIG. 7 illustrates a block diagram of a mobile device according to certain embodiments of the present disclosure.

FIG. 7 illustrates a block diagram of a mobile device 112 according to certain embodiments of the present disclosure. The mobile device 112 includes a wireless transceiver 710, a processor 720, a memory 730, a module 740, and a display screen 750. The components included in the mobile device 112 can be further broken down into more than one component and/or combined together in any suitable arrangement. Further, one or more components can be rearranged, changed, added, and/or removed.

Referring to the wireless transceiver 710, the wireless transceiver 710 can be configured to receive signals from the tracking device 106 and/or any other components of the environment 100. In some embodiments, the wireless transceiver 710 can also be configured to transmit signals to the tracking device 106 and/or any other components of the environment 100. The wireless transceiver 710 can enable the communication with the tracking device 106 via the wireless network 114. For example, the wireless transceiver 710 can receive a notification signal from the tracking device 106. The notification signal can indicate when the mobile device 112 and/or the user enters within the proximity value of the tracking device 106. The notification signal can also include identification information of the exercise device to which the tracking device is attached. In some embodiments, the wireless transceiver 710 can receive a second notification signal from the tracking device 106. The second notification signal can indicate when the mobile device 112 or the user becomes outside the second proximity value of the tracking device 106. In some embodiments, the wireless transceiver 710 can also be configured to transmit a report generated by the mobile device 112 to the tracking device 106 and/or other components of the environment 100.

The processor 720 can include one or more cores and can accommodate one or more threads to run various applications and modules. The software can run on the processor 720 capable of executing computer instructions or computer code. The processor 720 can also be implemented in hardware using an ASIC, PLA, FPGA, or any other integrated circuit.

The memory 730 can be a non-transitory computer readable medium, flash memory, a magnetic disk drive, an optical drive, a PROM, a ROM, or any other memory or combination of memories.

The processor 720 can be configured to run the module 740 stored in the memory 730 that is configured to cause the processor 720 to perform various steps that are discussed in the disclosed subject matter. For example, the module 740 can be configured to cause the processor 720 to receive the notification signal from the tracking device 106 via the wireless transceiver 710. The notification signal can indicate when the mobile device 112 and/or the user enters within the proximity value of the tracking device 106. The notification signal can also include identification information of the exercise device to which the tracking device 106 is attached. The module 740 can be configured to cause the processor 720 to detect a received signal strength (RSS) of the notification signal. The module 740 can be configured to cause the processor 720 to determine whether the RSS is above or at a pre-determined threshold. The pre-determined threshold can be −10 dBm, −20 dBm, or any other suitable value. When RSS is above or at the pre-determined threshold, the module 740 can be configured to cause the processor 720 to record the identification information of the exercise device that the tracking device 106 is attached to and establish a link between the tracking device 106 and the mobile device 112. When the RSS is below the pre-determined threshold, the module 740 can be configured to cause the processor 720 to ignore the notification signal. In some embodiments, when the RSS of the notification signal is above or at the pre-determined threshold, the module 740 can be configured to cause the processor 720 to record a start time associated with the notification signal. In some embodiments, the module 740 can be configured to cause the processor 720 receive a second notification signal from the tracking device 106 via the transceiver 710. The second notification signal can indicate when the mobile device 112 and/or the user becomes outside a second proximity value of the tracking device 106. In some embodiments, the module 740 can be configured to cause the processor 710 to, in response to receiving the second notification signal, record an end time associated with the second notification signal. In some embodiments, the module 740 can be configured to cause the processor 710 to generate a report based on the start time, the end time, and the identification information.

The module 740 can include a mobile application. In some embodiments, the application may be downloaded and used by a user to keep track of his or her exercise on a real-time basis from the mobile device 112. In some embodiments, the user can check current or past records of the exercises from the server 104 and/or other components of the environment 100. In general, the application may comprise a login or registration module for users to manage their profile or account information, a primary user interface that integrates most functions of the application, and a configuration or settings module. For instance, the primary user interface of the application may allow the users to receive and view reminders, notifications and reports of their exercise or workout activities.

Referring to the display screen 750, the display screen 750 can be configured to display various exercise reports generated by the mobile device 112. The display screen 750 can be a touch screen, an LCD screen, and/or any other suitable display screen or combination of display screens.

Figure 8:
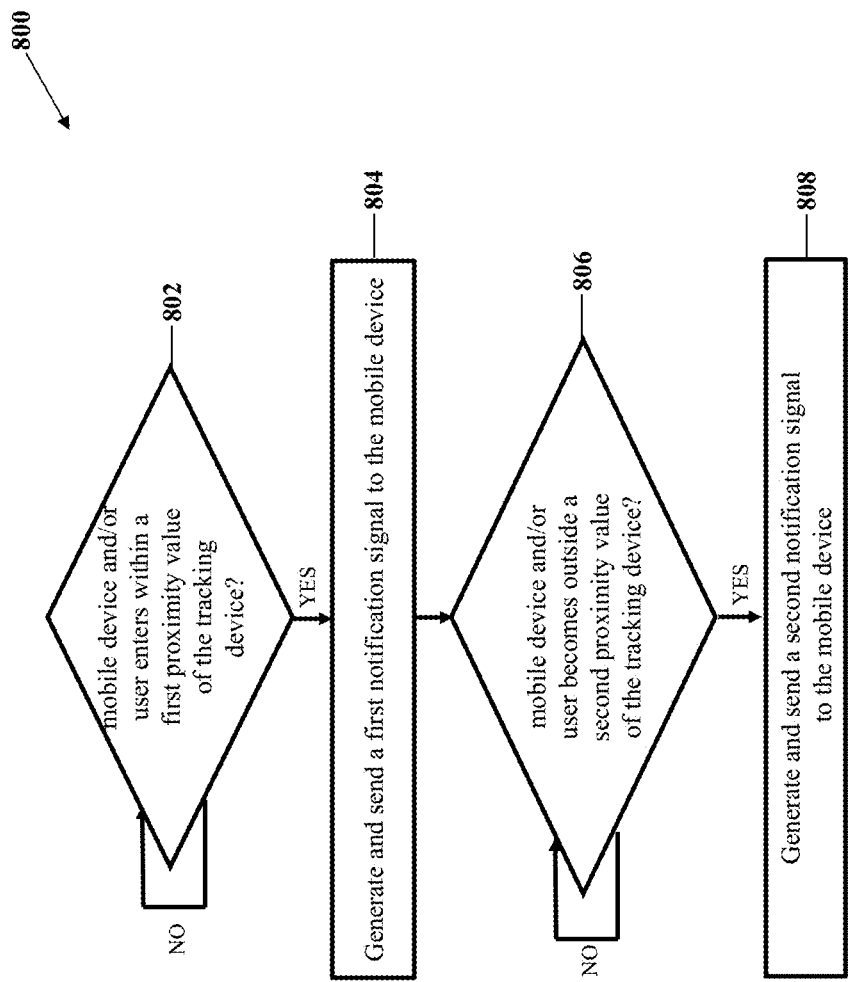
FIG. 8 is a flow chart illustrating a process of tracking, collecting, and/or analyzing user data for gyms according to certain embodiments of the present disclosure.

FIG. 8 is a flow chart illustrating a process 800 of tracking, collecting, and/or analyzing user data for gyms according to certain embodiments of the present disclosure. The process 800 is mainly illustrated from the perspective of the tracking device 106. In some embodiments, the process 800 can be modified by, for example, having steps rearranged, changed, added, and/or removed.

At step 802, the tracking device 106 detects when a mobile device 112 or the user associated with the mobile device 112 enters within a proximity value of the tracking device 106. In some embodiments, the tracking device 106 can detect when (1) the user is in its proximity, (2) the mobile device 112 is in its proximity, or (3) both the user and the mobile device 112 are in its proximity, or a sequence of one or more of the three conditions above. For example, the sequence of events can be: first a user is detected, then the mobile device 112 is detected. In some embodiments, as described in connection with FIG. 5, the tracking device 106 can use more than one sensor to determine whether or not the mobile device and/or the user associated with the mobile device enters within the proximity value of the tracking device 106. When the tracking device 106 determines the mobile device 112 and/or the user enters within the proximity value of the tracking device, the process 800 proceeds to step 804.

At step 804, the tracking device 106 generates and sends a first notification signal to the mobile device 112. The first notification signal can notify the mobile device 112 when the mobile device 112 and/or the user enters within the proximity value of the tracking device 106. The notification signal an also include identification information of the exercise device that the tracking device 106 is attached to.

In some embodiments, when the user and/or the mobile device 112 is within the proximity value of the tracking device 106, the tracking device 106 can detect, through its motion sensor system 620, the exercise activities that the user is conducting on/with the exercise device, such as how many chest presses have been conducted. The tracking device 106 can report the exercise activities to the mobile device 112 and/or other components of the environment 100 either periodically or when the tracking device 106 later detects that the mobile device 112 and/or the user becomes outside a second proximity value of the tracking device 106.

At step 806, the tracking device 106 detects when the mobile device 112 and/or the user becomes outside the second proximity value of the tracking device 106. When the tracking device 106 determines the mobile device 112 and/or the user becomes outside the second proximity value of the tracking device 106, the process 800 proceeds to step 808.

At step 808, the tracking device 106 generates and sends a second notification signal to the mobile device 112. The second notification signal can notify the mobile device 112 when the mobile device 112 and/or the user becomes outside the second proximity value of the tracking device 106.

Figure 9A:
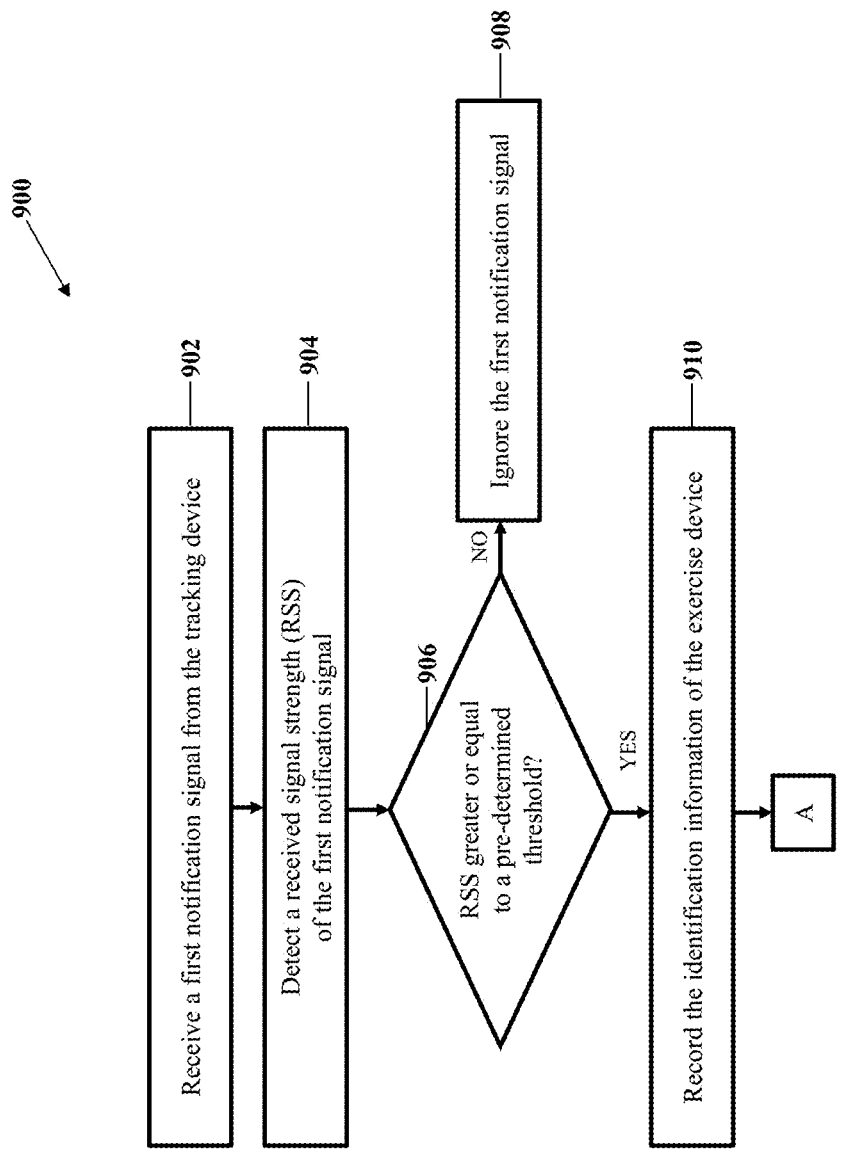
FIGS. 9A and 9B are flow charts illustrating a process of tracking, collecting, and/or analyzing user data for gyms according to certain embodiments of the present disclosure.
Figure 9B:
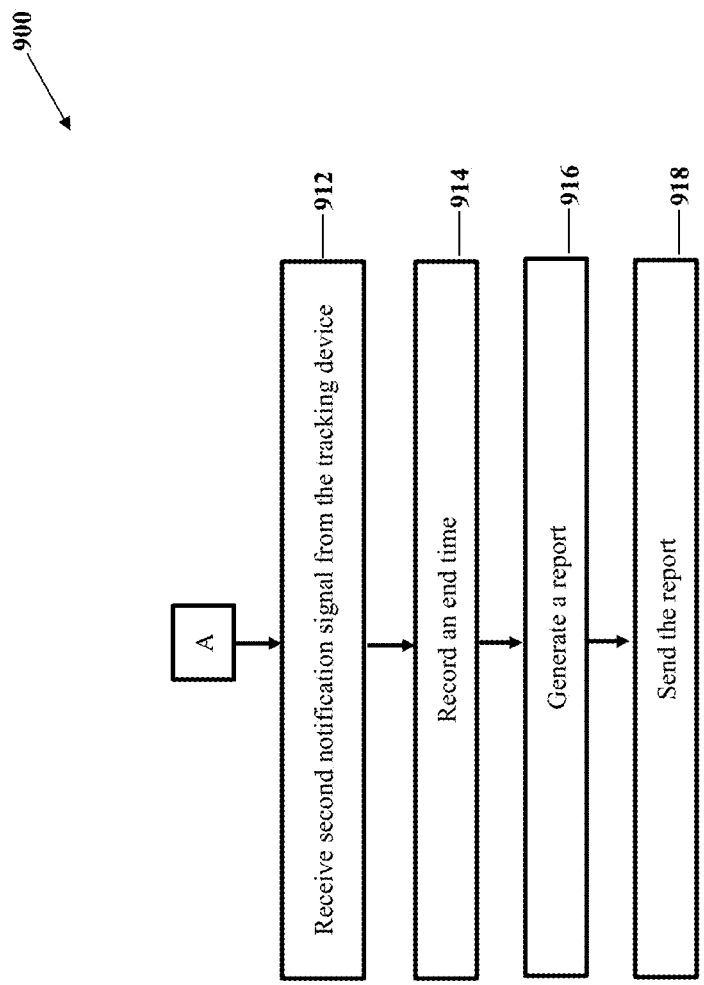

FIGS. 9A and 9B are flow charts illustrating a process 900 of tracking, collecting, and/or analyzing user data for gyms according to certain embodiments of the present disclosure. The process 900 is mainly illustrated from the perspective of the mobile device 112. In some embodiments, the process 900 can be modified by, for example, having steps rearranged, changed, added, and/or removed.

At step 902, the mobile device 902 receives a first notification signal from the tracking device 106. The first notification signal can indicate when the mobile device 112 and/or the user associated with the mobile device 112 enters within a proximity value of the tracking device 106. The notification signal can also include identification information of the exercise device that is attached to the tracking device 106.

At step 904, the mobile device 112 detects the RSS of the first notification signal.

At step 906, the mobile device 112 determines whether the RSS of the first notification signal is above or at a pre-determined threshold. If the RSS of the first notification signal is above or at the pre-determined threshold, the process 900 proceeds to step 910. If the RSS of the first notification signal is below the pre-determined threshold, the process 900 proceeds to step 908.

At step 908, the mobile device 112 ignores the first notification signal and does not process it further.

At step 910, the mobile device 112 records the identification information of the exercise device. In some embodiments, the mobile device 112 also registers the exercise device and establishes a link between the tracking device 106. In some embodiments, the mobile device 112 ignores notification signals from other tracking devices until the mobile device 112 is notified that it leaves the tracking device 106. In some embodiments, the mobile device 112 also records a start time associated with the receipt of the first notification signal.

At step 912, the mobile device 112 receives a second notification signal from the tracking device 106. The second notification signal can indicate when the mobile device 112 or the user leaves the proximity value of the tracking device 106.

At step 914, the mobile device 112 records an end time associated with the receipt of the second notification signal.

At step 916, the mobile device 112 generates an exercise report of the user based on the start time, the end time, and the identification information of the exercise device. For example, the report can be a summary of the user's work-out session associated with the exercise device. The report can also include one or more items described in connection with FIGS. 2-4.

At step 918, the mobile device 112 sends the exercise report to the tracking device 106, the server 104, and/or other suitable components of the environment 100.

Figure 10A:
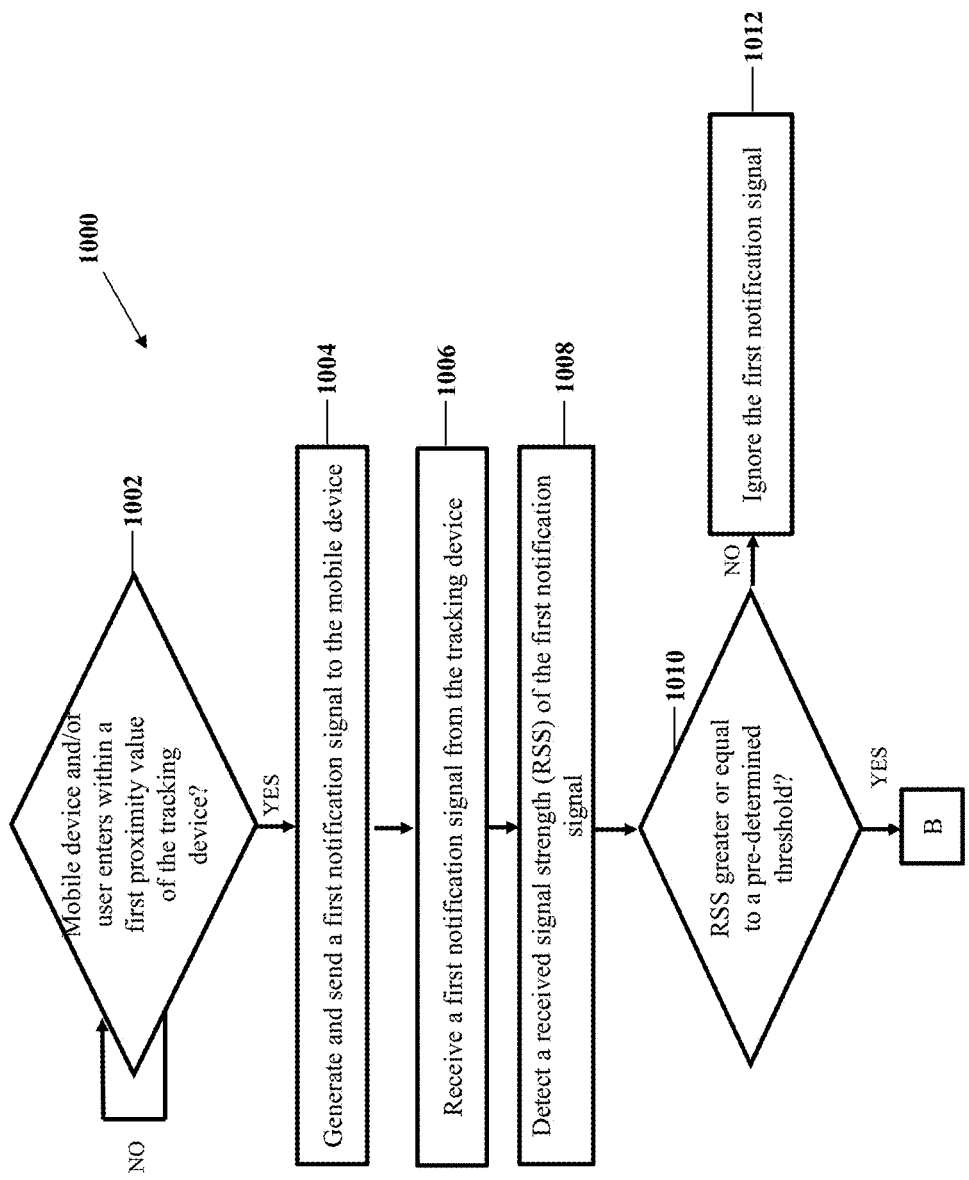
FIGS. 10A and 10B are flow charts illustrating a process of tracking, collecting, and/or analyzing user data for gyms according to certain embodiments of the present disclosure.
Figure 10B:
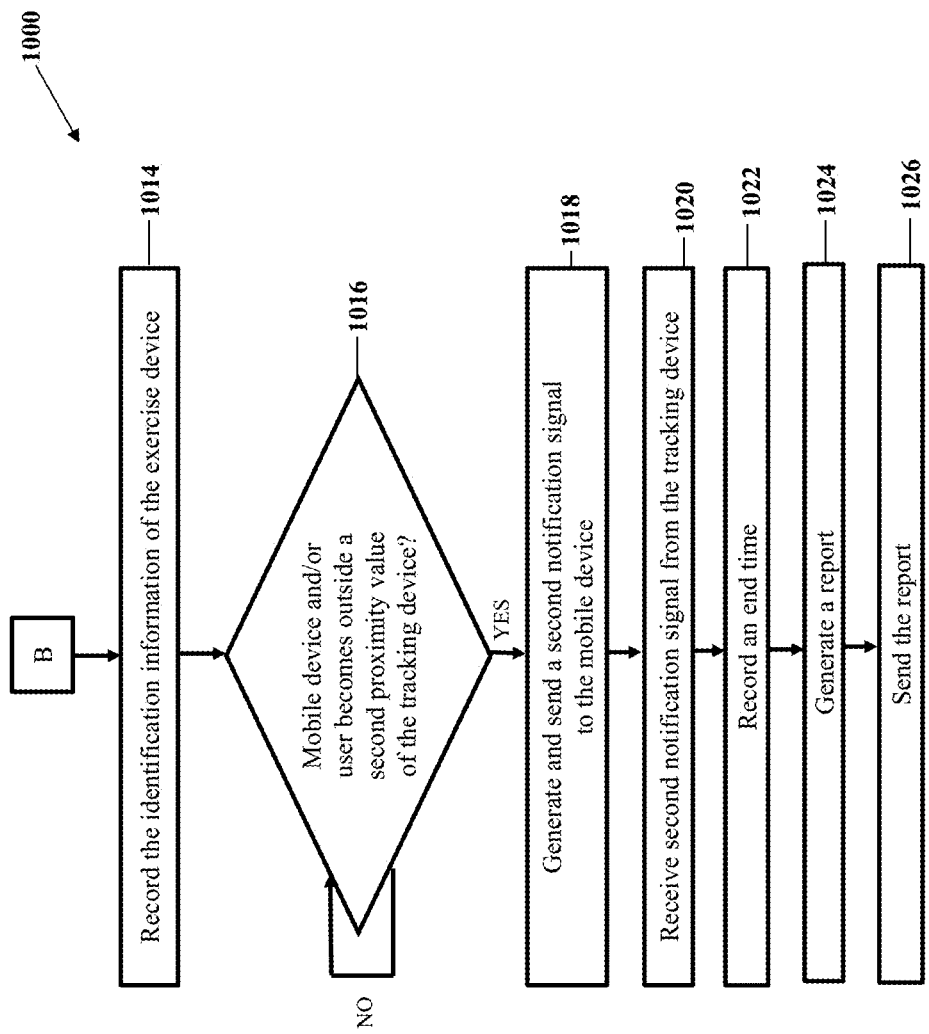

FIGS. 10A and 10B are flow charts illustrating a process 1000 of tracking, collecting, and/or analyzing user data for gyms according to certain embodiments of the present disclosure. The process 1000 is mainly illustrated from the perspective of the interaction between the tracking device 106 and mobile device 112. In some embodiments, the process 1000 can be modified by, for example, having steps rearranged, changed, added, and/or removed.

The steps of the process 1000 are similar to various steps of the process 800 and the process 900. For example, the steps 1002 and 1004 are similar to the steps 802 and 804, respectively; the steps 1006, 1008, 1010, 1012, and 1014 are similar to the steps 902, 904, 906, 908, and 910, respectively; the steps 1016 and 1018 are similar to the steps 806 and 808, respectively; and the steps 1020, 1022, 1024, and 1026 are similar to the steps of 912, 914, 916, and 918, respectively.

In the present disclosure, there are several ways for the tracking device 106 to detect when the user finishes using the exercise device. For example, in some embodiments, the tracking device 106 detects when the user and/or the user's mobile device 112 becomes outside a certain proximity value of the tracking device 106. As described earlier, the proximity value used to determine when the mobile device 112 and/or the user starts to use the exercise device can be the same as or different from the proximity value used to determine when the mobile device 112 and/or the user leaves the exercise device. In some embodiments, when the user is about to use the exercise device, she first holds her mobile device 112 close to the tracking device 106 so that the tracking device 106 knows the user is going to start a session. When the user finishes using the exercise device, she holds her mobile device 112 close to the tracking device 106 again so that the tracking device 106 knows the user is going to finish the session. Several use cases are explained below.

In one embodiment, when a user is ready to use an exercise device, she first holds her mobile device 112 close to the tracking device 106 attached to the exercise device. The proximity sensor system 610 of the tracking device 106, such as an ambient light proximity sensor, senses the mobile device 112 is in its proximity, and triggers the tracking device 106 to broadcast notification signals, which include the equipment ID of the exercise device, to the mobile device 112 and/or other components of the environment 100. When the user finishes using the exercise device, she can hold her mobile device 112 close to the tracking device 106 again. Once the proximity sensor system 610, such as the ambient light proximity sensor, detects it, the tracking device 106 knows this is after the first time the user holds her mobile device 112 close to the tracking device 106, and therefore broadcast notification signals, which include exercise results, to the mobile device 112 and/or other components of the environment 100. The user's mobile device 112 receives such notifications and stores the exercise information.

In another embodiment, when a user is ready to use an exercise device, he first holds his mobile device 112 close to the tracking device 106 attached to the exercise device. The proximity sensor system 610 of the tracking device 106, such as one or more PIR sensor, senses the mobile device 112 is in its proximity, and triggers the tracking device 106 to broadcast notification signals, which include equipment ID of the exercise device, to the mobile device 112 and/or other components of the environment 100. When the user finishes using the exercise device, he can hold her mobile device 112 close to the tracking device 106 again. Once the proximity sensor system 610, such as the one or more PIR sensors, detects it, the tracking device 106 knows this is after the first time the user holds her mobile device 112 close to the tracking device 106, and therefore broadcast notification signals, which include exercise results, to the mobile device 112 and/or other components of the environment 100. The user's mobile device 112 receives such notifications and stores the exercise information.

In yet another embodiment, when a user is ready to use an exercise device, he first holds his mobile device 112 close to the tracking device 106. The proximity sensor system 610 of the tracking device 106 senses the mobile device 112 is in its proximity, then broadcasts notifications, which can include equipment type and ID. When he finishes using the equipment, he simply leaves the exercise device, without holding his mobile device 112 close to the tracking device 106. The proximity sensor system 610 detects the user is leaving, and therefore broadcast notification signals, which include exercise results, to the mobile device 112 and/or other components of the environment 100. The user's mobile device 112 receives such notifications and stores the exercise information.

When the mobile device 112 first receives notification signals indicating the start of a work-out session from one or more exercise devices, it picks the message with the strongest received signal strength (RSS) which passes a predetermined threshold. Then the mobile device 112 remembers the identity information from this exercise device and ignores notification messages from all other exercises devices hereafter. The identity information that serves as the filtering criteria can be the unique low-power wireless interface ID, the equipment ID, or any other suitable information or combinations of the information. When the user finishes the exercise and leaves the equipment, then as described above, the proximity sensor system 610 triggers the tracking device 106 to broadcast notification signals to indicate the end of the current session. Once received, the mobile device 112 forgets the current identity information upon receiving such end-session notification signals.

The tracking device 106 and the mobile device 112 can communicate with the server 104. In some embodiments, when the server 104 locates remotely as a cloud server, it communicates with the tracking device 106 and/or the mobile device 112 through the gateway. For example, when the tracking device 106 transmits a notification signal to the mobile device 112, it can send the payload of the notification signal, and optionally other vital related information, such as remaining battery level, run-time statistics, or any other suitable information or combination of information, to the server 104. With this information, the server 104 can authenticate the events reported from the mobile device 112 by comparing against the data sent from the tracking device 106.

In some embodiments, when the bi-directional connection is established between the mobile device 112 and the tracking device 106, the tracking device 106 has the user information. The tracking device 106 and/or the mobile device 112 can send the exercise activity information and the user information to the server 104.

In some embodiments, if the tracking device 106 is battery-operated, the tracking device 106 can send battery information, such as a brownout event, to the gateway of the server 104, so that gym operators can be timely informed to replace the battery of the tracking device.

In some embodiments, regardless the exercise device is used or not, the tracking device 106 can periodically report its run-time status and statistics to the gateway, for bookkeeping and diagnosis purpose of the tracking device 106 and/or the exercise device.

In some embodiments, the tracking device 106 can receive commands from the gateway, such as flashing an LED to identify itself, so that a gym operator can easily identify the tracking device 106.

In some embodiments, the server 104 may provide a front-end user interface (UI), such as a website, a dedicated PC, or a mobile application, for gym operators and/or trainers to access the users exercise activities, so that proper guidance, advice, and/or training can be provided to the users. In some embodiments, a user interface on mobile and/or web interface can also be provided to users on mobile devices, for the purpose to monitor and track their exercise activities, as described above.

In some embodiments, a user's detailed exercise information is collected and stored in the server 104. The information includes, but not limited to, start/end time and date, equipment type, duration, sets and repeats (for pin-loaded equipment, workbenches, and power racks), break intervals in all sessions recorded by the mobile device 112 and/or the tracking device 106 associated with exercise device. The data can be organized and displayed in many ways through the front-end user interface (UI).

Figure 2:
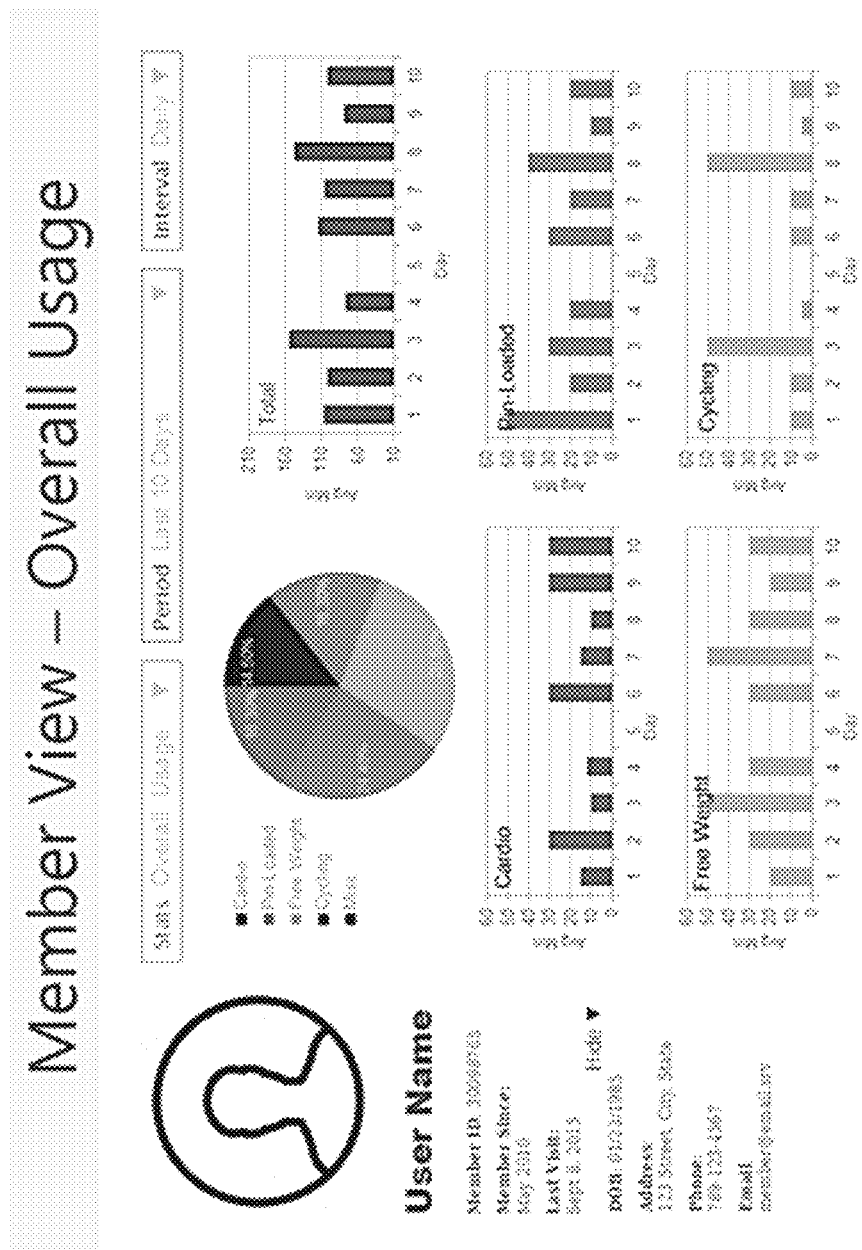
FIG. 2 illustrates an exemplary user interface displaying a user's overall gym exercise data during one visit according to certain embodiments of the present disclosure.

FIG. 2 illustrates an exemplary user interface displaying a user's overall gym exercise data in last 10 days according to certain embodiments of the present disclosure. In one tab or page of the mobile UI, the user's exercise summary in the last 10 days is displayed. The category of used equipment, durations of each, percentage of each type, are shown to the user.

Figure 3:
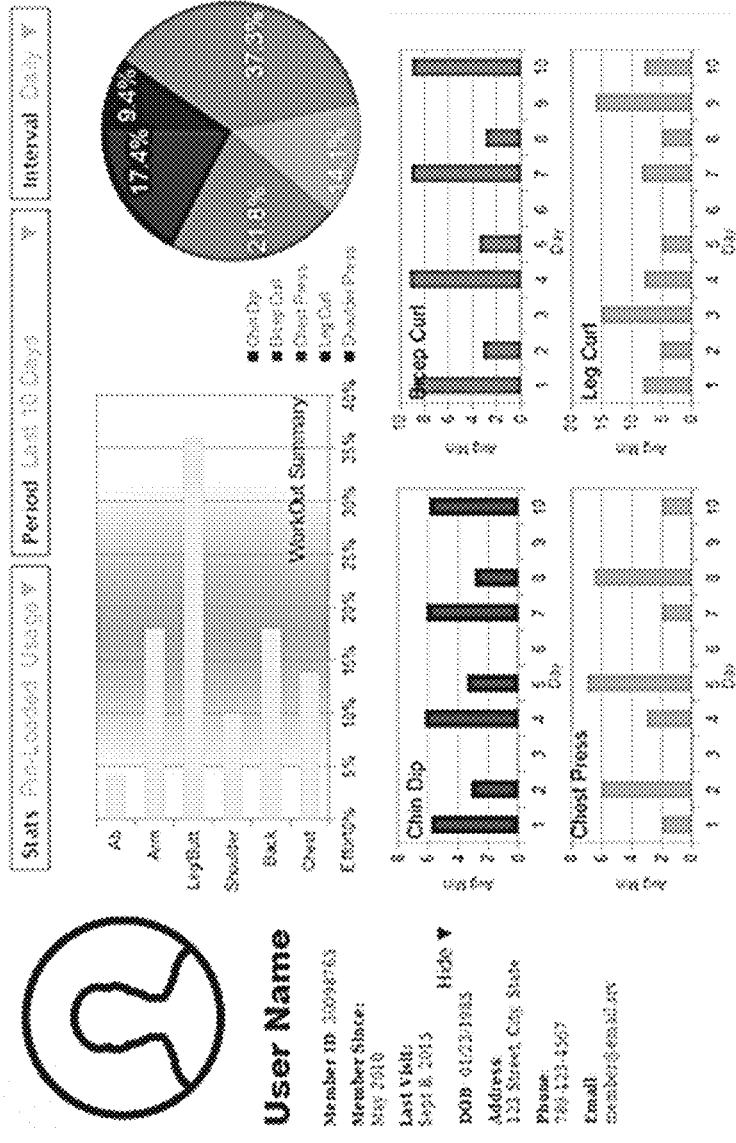
FIG. 3 illustrates another exemplary user interface displaying a user's pin-loaded exercise data during one visit according certain embodiments of the present disclosure.

FIG. 3 illustrates another exemplary user interface displaying a user's pin-loaded exercise data in last 10 days according certain embodiments of the present disclosure. This view can be shown in another tab or page of the mobile UI, which includes the user's activities using one specific type of equipment in a time period (such as one week, one month, or any period specified by the user), and corresponding time or counts allocation to each parts of his/her body.

Figure 4:
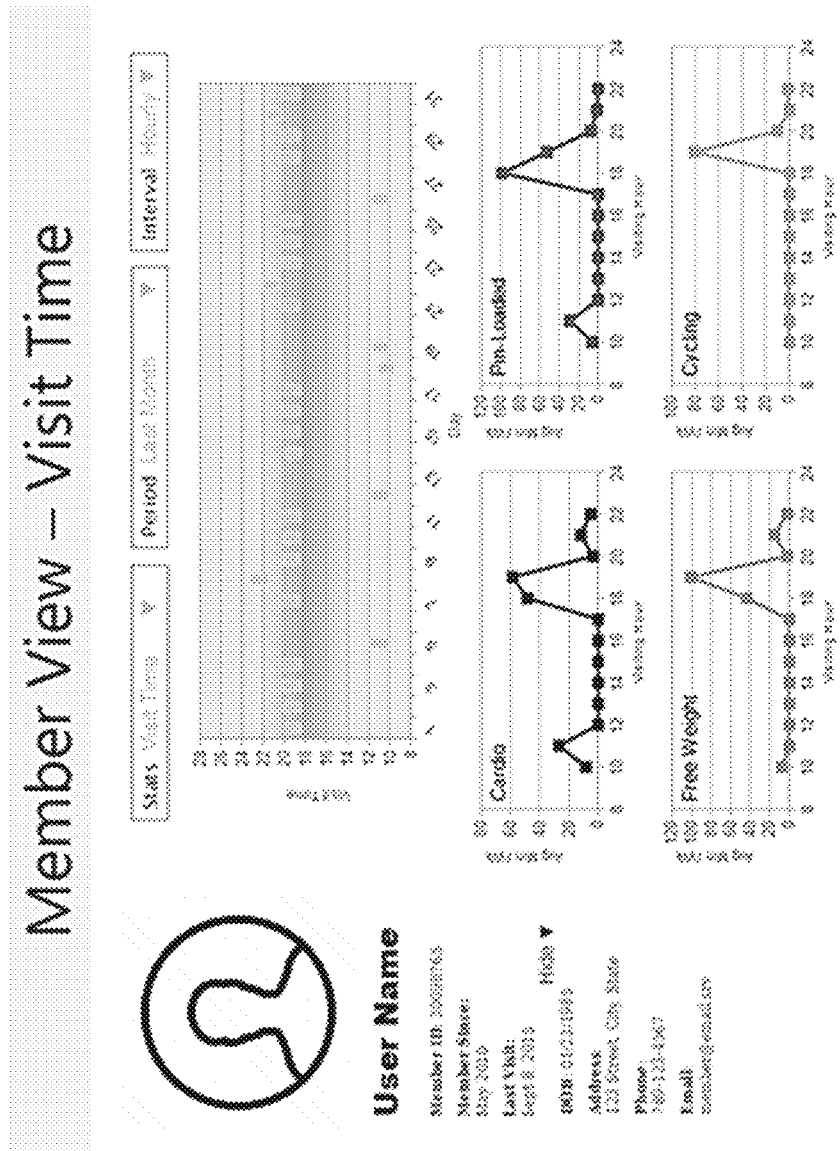
FIG. 4 illustrates yet another exemplary user interface according to certain embodiments of the present disclosure.

FIG. 4 illustrates yet another exemplary user interface according to certain embodiments of the present disclosure. This view can be displayed in another tab or page of the mobile UI, or on the gym operators' web interface. The view summarizes and shows the user's exercise pattern, such as visit times and frequency.

In some embodiments, the aggregated data of all members collected through mobile devices can be combined to track the equipment usage, improve operation efficiency of gyms, and provide more insights to optimize members' exercise routines.

In some embodiments, the same type of equipment can be grouped together. For a certain group, its total number of visiting members, total number of visits, and total operation time can be compared against those of other groups. If one group has significantly more users than another group, the gym can look into the scenarios and decide which group or groups need to add or reduce number of equipment.

In some embodiments, individual equipment can be compared against others of the same type, particularly when they are physically close. If one specific exercise device always has less member accesses than others or no member accesses, the gym operators may be informed to check the device. This may indicate that the exercise device has certain issues, such as a defect, being close to an environment that is not user-friendly, or something else that needs the gym operators' attention.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A tracking device attached to an exercise device, comprising:
    a non-radio frequency ("non-RF") proximity sensor system configured to (1) detect when a mobile device or a user associated with the mobile device enters within a proximity value of the non-RF proximity sensor system and (2) detect when the mobile device or the user becomes outside a second proximity value of the non-RF proximity sensor system;
    a wireless transceiver configured to transmit at least one signal to the mobile device;
    a memory; and
    a processor, coupled to the non-RF proximity sensor system and the wireless transceiver, configured to run a module stored in the memory that is configured to cause the processor to:
        receive an onboard signal from the non-RF proximity sensor system indicating when the mobile device or the user enters within the proximity value of the non-RF proximity sensor system,
        in response to receiving the onboard signal, generate a command signal that causes the wireless transceiver to send a notification signal to the mobile device, wherein the notification signal (1) notifies the mobile device when the mobile device or the user enters within the proximity value of the non-RF proximity sensor system and (2) includes identification information of the exercise device,
        receive a departure signal from the non-RF proximity sensor system indicating when the mobile device or the user becomes outside the second proximity value of the non-RF proximity sensor system, and
        in response to receiving the departure signal, generate a second command signal that causes the wireless transceiver to send a second notification signal to the mobile device, wherein the second notification signal notifies the mobile device when the mobile device or the user becomes outside the second proximity value of the non-RF proximity sensor system.

2. The tracking device of claim 1, wherein the proximity value and the second proximity value are the same.

3. The tracking device claim 1, wherein the proximity value and the second proximity value are different.

4. The tracking device of claim 1, wherein the wireless transceiver is further configured to transmit one or more status signals to a server, wherein the one or more status signals include at least one of a payload of the notification signal, a battery level of the tracking device, or run-time statistics.

5. The tracking device of claim 1, wherein the non-RF proximity sensor system comprises a first non-RF proximity sensor with a first detection area and a second non-RF proximity sensor with a second detection area, wherein the non-RF proximity sensor system determines that the mobile device or the user enters within the proximity value of the non-RF proximity sensor system when the mobile device or the user is within both the first detection area and the second detection area.

6. The tracking device of claim 1, wherein the non-RF proximity sensor system comprises at least one of a passive infra-red sensor, an ambient light sensor, a photoelectric sensor, an ultrasonic sensor, a time of flight distance sensor, or a thermopile sensor.

7. The tracking device of claim 1, further comprising a motion sensor configured to detect motions of the user.

8. The tracking device of claim 1, wherein the wireless transceiver is further configured to receive at least one reporting signal from the mobile device, wherein the at least one reporting signal is related to motions of the user.

9. A mobile device, comprising:
    a wireless transceiver configured to receive at least one signal from a tracking device attached to an exercise device;
    a memory; and
    a processor, coupled to the wireless transceiver, configured to run a module stored in the memory that is configured to cause the processor to:
        receive a notification signal from the tracking device via the wireless transceiver, wherein the notification signal (1) indicates when the mobile device or a user associated with the mobile device enters within a proximity value of the tracking device and (2) includes identification information of the exercise device,
        detect a received signal strength (RSS) of the notification signal,
        determine whether the RSS is above or at a pre-determined threshold,
        when the RSS is above or at the pre-determined threshold, record the identification information of the exercise device and a start time associated with the notification signal,
        when the RSS is below the pre-determined threshold, ignore the notification signal,
        receive a second notification signal from the tracking device via the wireless transceiver, wherein the second notification signal indicates when the mobile device or the user becomes outside a second proximity value of the tracking device,
        in response to receiving the second notification signal, record an end time associated with the second notification, and
        generate a report based on the start time, the end time, and the identification information.

10. The mobile device of claim 9, wherein the proximity value and the second proximity value are the same.

11. The mobile device of claim 9, wherein the proximity value and the second proximity value are different.

12. The mobile device of claim 9, wherein the wireless transceiver is further configured to transmit the report to the tracking device or a server.

13. The mobile device of claim 9, further comprising a display screen configured to display the report.

14. The mobile device of claim 9, wherein the mobile device is at least one of a smartphone, a tablet, or a wearable device.

15. A system, comprising:
a mobile device associated with a user; and
a tracking device attached to an exercise device and wirelessly coupled to the mobile device,
wherein the tracking device is configured to:
detect when the mobile device or the user enters within a proximity value of the tracking device,
send a notification signal to the mobile device, wherein the notification signal (1) notifies the mobile device when the mobile device or the user enters within the proximity value of the tracking device and (2) includes identification information of the exercise device, wherein the mobile device is configured to:
receive the notification signal from the tracking device,
detect a received signal strength (RSS) of the notification signal,
determine whether the RSS is above or at a pre-determined threshold,
when the RSS is above or at the pre-determined threshold, record the identification information of the exercise device,
when the RSS is below the pre-determined threshold, ignore the notification signal,
detect when the mobile device or the user becomes outside a second proximity value of the tracking device, and
send a second notification signal to the mobile device, wherein the second notification signal notifies the mobile device when the mobile device or the user becomes outside the second proximity value of the tracking device.

16. The system of claim 15, wherein the mobile device is further configured to, when the RSS is above or at the pre-determined threshold, record a start time associated with the notification signal.

17. The system of claim 15, wherein the proximity value and the second proximity value are the same.

18. The system of claim 15, wherein the proximity value and the second proximity value are different.

19. The system of claim 16, wherein the mobile device is further configured to:
receive a second notification signal from the tracking device,
in response to receiving the second notification signal, record an end time associated with the second notification, and
generate a report based on the start time, the end time, and the identification information.

20. The system of claim 19, where in the mobile device is further configured to transmit the report to the tracking device or a server.

21. The system of claim 15, wherein the mobile device is at least one of a smartphone, a tablet, or a wearable device.

* * * * *